(12) United States Patent
Margolis

(10) Patent No.: US 7,869,139 B2
(45) Date of Patent: Jan. 11, 2011

(54) MODULAR AFOCAL VARIATOR OPTICAL SYSTEM PROVIDING FOCUS WITH CONSTANT MAGNIFICATION

(75) Inventor: H. Jay Margolis, Boulder, CO (US)

(73) Assignee: Infinity Photo Optical, Boulder, CO (US)

( * ) Notice: Subject to any disclaimer, the term of this patent is extended or adjusted under 35 U.S.C. 154(b) by 0 days.

(21) Appl. No.: 12/605,554

(22) Filed: Oct. 26, 2009

(65) Prior Publication Data

US 2010/0110568 A1 May 6, 2010

Related U.S. Application Data

(60) Provisional application No. 61/109,612, filed on Oct. 30, 2008.

(51) Int. Cl.
*G02B 13/00* (2006.01)
(52) U.S. Cl. ....................................... 359/744; 359/672
(58) Field of Classification Search ......... 359/672–675, 359/744
See application file for complete search history.

(56) References Cited

U.S. PATENT DOCUMENTS

| 2,937,570 A | 5/1960 | Hillman |
| 4,318,585 A | 3/1982 | Matsumura |
| 4,988,173 A | 1/1991 | Margolis |
| 5,054,896 A | 10/1991 | Margolis |
| 5,452,133 A | 9/1995 | Margolis |

FOREIGN PATENT DOCUMENTS

FR 2572545 5/1986

*Primary Examiner*—Darryl J Collins
(74) *Attorney, Agent, or Firm*—Greenlee Winner PC

(57) ABSTRACT

The present invention provides optical systems containing an afocal variator able to impart focus means to the optical system, as well as essentially constant magnification throughout the focal translation. The present application teaches a specific formula or set of spacing requirements for the positioning of the afocal variator that can be used with any afocal variator optical lens system comprised of various lens combinations. Provided that the formula for spacing the afocal variator within the optical system is utilized, the afocal variator acts not only to focus the optical system but maintains substantially constant magnification during the translation of focus.

5 Claims, 4 Drawing Sheets

MODULAR AFOCAL VARIATOR OPTICAL SYSTEM PROVIDING FOCUS WITH CONSTANT MAGNIFICATION

CROSS-REFERENCE TO RELATED APPLICATIONS

This application claims the benefit of U.S. Provisional Application 61/109,612, filed Oct. 30, 2008, which is incorporated herein in its entirety to the extent not inconsistent herewith.

BACKGROUND OF THE INVENTION

The present invention relates to combined optical systems in which an afocal variator optical system is specifically positioned to provide not only focusing means, but virtually constant magnification during focal translation.

Optical variators are typically used in optical systems to change the magnification of an image. For example, afocal variators have been used in projector lenses to alter the size of a projected image on a screen. In many instances, optical variator devices are used in combination with a front optical system or a rear optical system. In some instances they have even been used in combination with both a front objective system and a rear optical system. However, traditional optical systems which incorporate variator optical systems to alter the size of an image are not able to focus the image, and are usually only functional at relatively short back focal distances.

In the past where it has been desired to alter focal length, this has usually been accomplished by continuously or discretely changing the length of the optical system, or by changing the location or type of imaging lenses in the front or rear optical systems of the device, or in both front and rear optical systems. Hillman (U.S. Pat. No. 2,937,570) discloses a telescope system in which the image forming lenses are moved in order to focus the system. That is, focusing is accomplished by moving objective lens and focusing lens, which are part of the telescope's "formula-specific" objective imaging system. Focusing is not accomplished or taught to be feasible by moving a portion of an afocal variator, nor by moving a portion of any other non-image forming modular optical lens system. It does not include a central afocal variator module which does not comprise a portion of the image-forming optics. If any of the movable lenses of any of the systems taught by Hillman were removed, the entire system would be affected, very probably to the point that the system would no longer function for its intended purpose. Quenderff (French Patent No. 2,572,545) uses a zoom lens to make enlarged pictures, and also teaches the use of various art known mechanical devices for connecting together optical modules. However, it neither teaches nor suggests the use of a central afocal variator module as a focusing element.

Margolis (U.S. Pat. No. 4,988,173), in contrast, teaches the use of an afocal variator optical system which can be used in optical instruments, such as long-distance microscopes, as the mechanism for providing focus. However in this reference and all other references known to the applicant, no optical focusing systems have been used with an afocal variator which imparts virtually constant magnification through the range of focal translation. While the noted reference teaches the use of an afocal variator as the focusing means of optical systems, it does not additionally teach that under specific conditions and positions the afocal variator can, in and of itself, be positioned to impart virtually constant magnification through the range of focal translation.

SUMMARY OF THE INVENTION

In view of the foregoing, it is an object of the present invention to provide optical systems in which an afocal variator is positioned to impart focus means to the optical system, as well as essentially constant magnification throughout the focal translation. The present application teaches a specific formula or set of spacing requirements that can be used with any afocal variator optical lens system comprised of various lens combinations. Provided that the formula for spacing the afocal variator within the optical system is utilized, the afocal variator acts not only to focus the optical system but maintains substantially constant magnification during the translation of focus. Therefore, the use of an afocal variator is not only an indiscriminate means of focus but also acts specifically to provide constant or essentially constant magnification during such focus.

The imaging optical system of the present invention comprises an optical housing; an objective lens system disposed at one end of the optical housing and having a first focal plane; and a modular afocal variator disposed within the optical housing in optical series with the objective lens system. The modular afocal variator comprises a first positive lens system, a central negative lens system, and a second positive lens system, where the central negative lens system is positioned between the first and second positive lens systems and is able to be moved continuously towards and away from the first positive lens system and towards and away from the second positive lens system. The modular afocal variator is placed at a position so as to provide focus to the optical system while maintaining essentially constant magnification throughout the focal translation.

As described herein, the modular afocal variator is positioned between the objective lens system and the focal plane so that the first positive lens system is closer to the objective lens than the second positive lens system. In one embodiment, the modular afocal variator is positioned so that the distance between the first positive lens system and the focal plane is 66% (±15%) of the focal length of the first positive lens system, and the distance between the second positive lens system and the focal plane is 100% (±15%) of the absolute value of the focal length of the central negative lens system.

In another embodiment, the modular afocal variator is positioned so that the distance between the first positive lens system and the focal plane of the objective lens system is between 50% to 80% of the absolute value of the focal length of the first or second positive lens system. Preferably the distance between the first positive lens system and the focal plane is between 60% to 70% of the absolute value of the focal length of the first or second positive lens system. The focal length of the second positive lens system should be within 10% of the focal length of the first positive lens system (as expressed in positive terms), preferably within 5% of the focal length of the first positive lens system. More preferably, the focal lengths of the first and second positive lens systems are the same. The modular afocal variator is additionally positioned so that the distance between the second positive lens system and the focal plane is between 85% to 115% of the absolute value of the focal length of the central negative lens system. Preferably, the distance between the second positive lens system and the focal plane is between 95% to 105% of the absolute value of the focal length of the central negative lens system.

The objective lens system can comprise a single lens or multiple lenses. The objective lens system produces the focal plane either alone or in conjunction with other optical components, such as additional lenses, that may be present and positioned within the optical housing. An intermediary image is the image of an object produced at the second focal plane by the objective lens and modular afocal variator along with any additional optical components incorporated into the device. Depending on the application, the intermediary image may be viewed by an observer, such as through an eye piece, or detected using a film or sensor. The intermediary image may also be further manipulated by subsequent optical components.

The optical housing is any tube or structure used in optics able to house lenses and other optical components. Preferably, the optical housing is an elongated approximately cylinder-shaped tube, but can be any shape suitable for optical devices as known in the art. The optical housing may also comprise means for adjusting or manipulating optical components disposed within the housing. For example, the optical housing may comprise known means in the art for moving the central negative lens system between the first and second positive lens systems.

The afocal variator as described herein can be used as the primary means of focus for an optical system or as a secondary or fine focus for an optical system that contains additional means for focus. For example, the optical system may comprise a mechanical focus as is known in the art or a second modular afocal variator which is not positioned according to the formula described herein to provide primary focus. In such a system, the primary focusing means is used to generally focus the image while the afocal variator as defined herein is used as the fine focus while maintaining the magnification of the image. It is another object of the present invention to provide a secondary or fine focus to optical systems which utilize a primary mechanical focus as is known in the art, said secondary or fine focus imparting an essentially constant magnification throughout the focal translation. It is also another object of the present invention to provide a secondary or fine focus to optical systems which incorporate internal optical focusing capabilities, such as taught in U.S. Pat. No. 4,988,173, said secondary or fine focus imparting an essentially constant magnification throughout the focal translation. The focusing means can be activated by any means known in the art either manually, by motorized activation or by remote control.

The light traveling through the optical system can be split as is known in the art to allow the optical device to manipulate or direct the different split beams as desired. Accordingly, the optical system may further comprise different port positions utilizing beamsplitters, mirror diverters, or other optical devices able to split a beam of light traveling through the optical system. Each different port position may comprise a modular afocal variator positioned as taught herein such that one or more of the port positions are able to be positions where an image is focused without essential magnification change beyond the original depth of field of the imaging optical system.

It is another object of the present invention to provide combined optical systems and computational systems which are predicated upon using the essentially constant magnification during focal translation as obtained from the present invention. Similarly, it is another object of the present invention to provide optical systems with essentially constant magnification throughout focal translation that can be reliably used to obtain data and other characteristics for use with computers or other analytical devices known in the art.

The present invention is designed for easy integration into robotically-controlled or motor-controlled optical systems, whether controlled manually or by computer control or by equivalent devices whether known in the art or developed in the future. The structure of the optical systems of the present invention allow out-gassing of the devices so that they may be used in vacuum environments such as laser focusing chambers or in outer space. In addition the present invention provides afocal variator focusing systems with essentially constant magnification which are economical to manufacture. The present invention also produces optical systems which have fields typical of those used in common video, photographical and microscopical practice, say equivalent to those of video sensors, microscope eyepieces and photographical formats used in common practice and, with the addition of suitable accessories, can project the image only virtually any screen or sensor, including large sizes such as are used in cinema projection or micro projection.

The foregoing and other objects of the present invention are obtained by providing an afocal variator to optical systems to vary the focus without the need to physically change the length dimension of the body or of the optical system, and without the need to change the lens system or the lens position of an additional lens system to the front or rear, all the while maintaining essentially constant magnification during focal translation. The system of the present invention is distinguished from other types of optical systems for imparting focus or the like in that, although based on an overall "covering formula" with regard to the positioning of the modular afocal variator, the optics so derived are otherwise non-formula specific. The "covering-formula" now taught by the present application provides the novel and unique arrangement of optical systems disclosed herein, imparting essentially constant magnification during focal translation. To applicant's knowledge, no such combined optical system with such characteristics is known in the art.

One embodiment of the invention provides an optical image system comprising a modular afocal variator system physically placed, interfaced or positioned modularly within the optical system, such that the focus provided by the modular afocal variator system to the entire optical system is of a specific character, namely, that focal translation above, through and below an object is essentially constant and without appreciable magnification change over a distance beyond that of the original depth of field of the optical system in which the modular afocal variator system is incorporated. Another embodiment of the invention provides methods of focusing the optical image system by placing the modular afocal variator within said optical image system. Preferably, the modular afocal variator system is placed 50% to 85%, more preferably 60% to 70%, of either the modular afocal variator's first positive lens system's or second positive lens system's focal length, as expressed in positive physical dimensional measurement, down from the original focal point of said imaging optical system's original focal plane. In one embodiment, the modular afocal variator system is placed 66%, +/−15%, chosen on the basis of either the modular afocal variator's first positive lens system's or second positive lens system's focal length, as expressed in positive physical dimensional measurement, down from the original focal point of said imaging optical system's original focal plane. Additionally, the modular afocal variator system is placed so that the second positive lens system is positioned 85% to 115% of the modular afocal variator's central negative lens system's focal length, as expressed in positive physical dimensional measurement, from the focal plane. Preferably, the second positive lens system is placed 100%, +/−15%, of the modular afocal variator's central negative lens element's focal length, as expressed in positive physical dimensional measurement, from the focal plane.

These and other objects of the present invention will become apparent to those skilled in the art from the following detailed description, showing the contemplated novel construction, combination, and elements herein described, and more particularly defined by the appended claims, it being understood that changes in the precise embodiments of the herein disclosed invention are meant to be included as coming within the scope of the claims, except insofar as they may be precluded by the prior art.

Additional features and advantages of the present devices and methods may be obtained by reference to the following detailed description and accompanying drawings that set forth illustrative embodiments, in which the principles of the methods, devices and apparatuses are utilized.

DETAILED DESCRIPTION

As used herein, the term "essentially constant magnification" means the magnification of an image remains the same or approximately the same as the original magnification as the image is focused. Preferably the magnification does not vary by more than 10% of the original magnification. More preferably the magnification does not vary by more than 5% of the original magnification. Even more preferably, the magnification does not vary by more than 1% of the original magnification.

As used herein, the term "focal plane" refers to the imaginary line perpendicular to the optical axis which passes through optical system's focal point. It is also the area behind the lens where light is gathered to form a sharply-focused image.

As used throughout this application, "modular afocal variator system" or "afocal variator" shall mean an optical system which includes in optical series a positive lens or lens system, sometimes called the "front positive lens system," a moveable central negative lens or lens system, sometimes called the "central negative lens system" and another positive lens or lens system, sometime called the "rear positive lens system," as described and taught in U.S. Pat. No. 4,988,173 (Margolis), including all permutations and equivalents.

Figure 1:
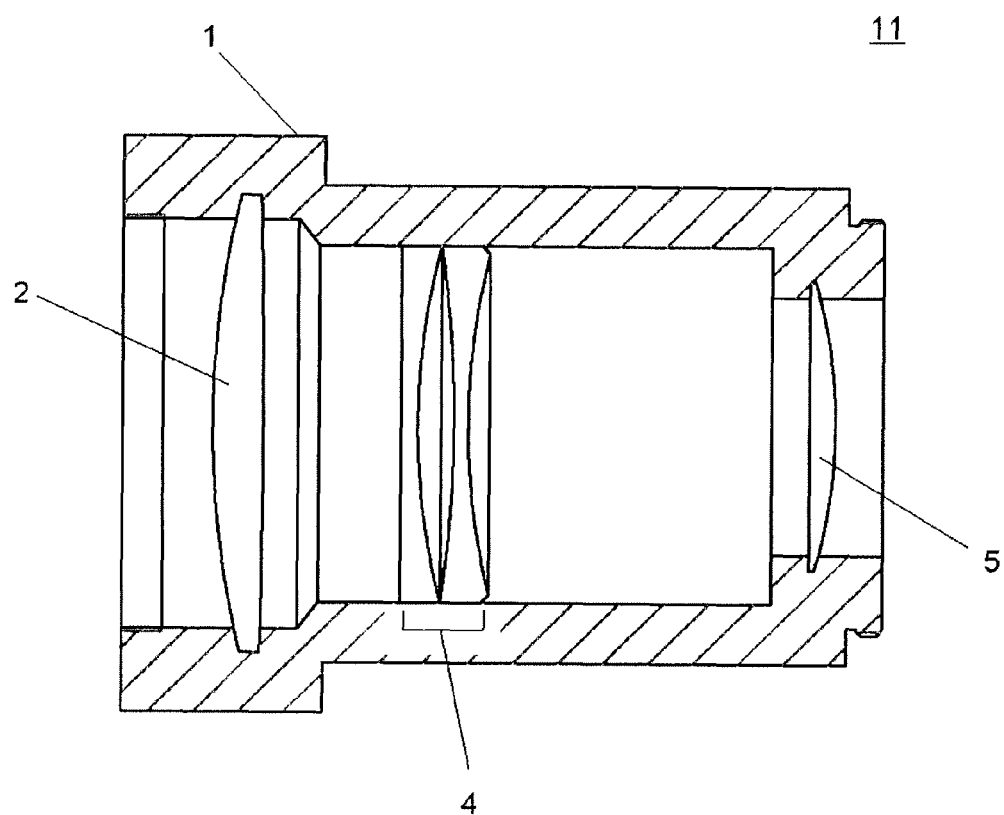
FIG. 1 is a diagram of a modular afocal variator as taught in the prior art containing a negative lens system positioned between a first and second positive lens system.

FIG. 1 is a diagram of a modular afocal variator optical system 11, according to U.S. Pat. No. 4,988,173 (Margolis) which consists of an optical housing 1 in which there is located a first positive lens system 2, in this instance having a c.160 mm focal length, a central negative lens system 4, in this case having a negative doublet of c.−60 mm focal length, and a second positive lens optical system 5, in this case having a c.160 mm focal length. As is known in the art and as taught by U.S. Pat. No. 4,988,173, when the modular afocal variator 11 is between imaging element lens systems, focus is imparted to the combined system by the activation of movement of the afocal variator's central negative lens system 4. The central negative lens system 4 can be moved using any device known in the art, such as a linear slider, a helical slider, or by any other art known means for providing continuous linear motion to the central negative lens system 4 within the optical housing 1.

Figure 2:
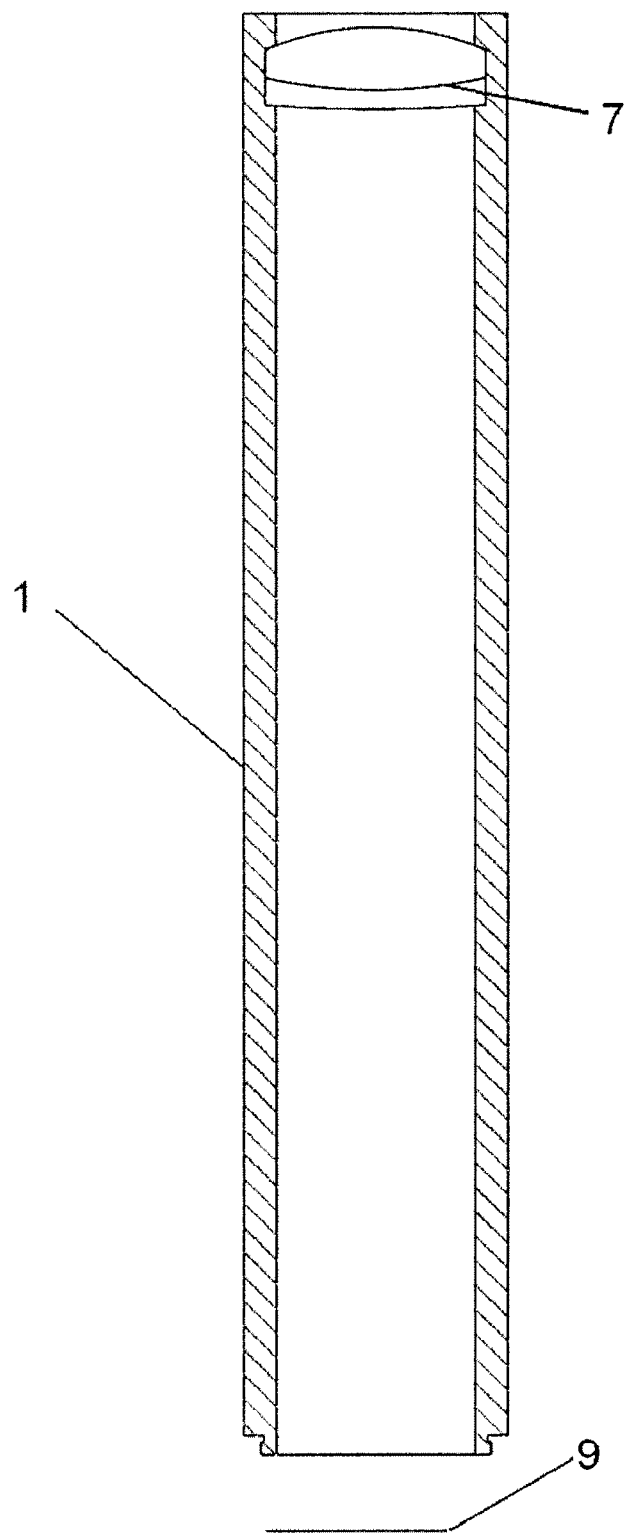
FIG. 2 is a diagram of an optical system containing an objective lens system able to form an image at a focal plane.
Figure 3:
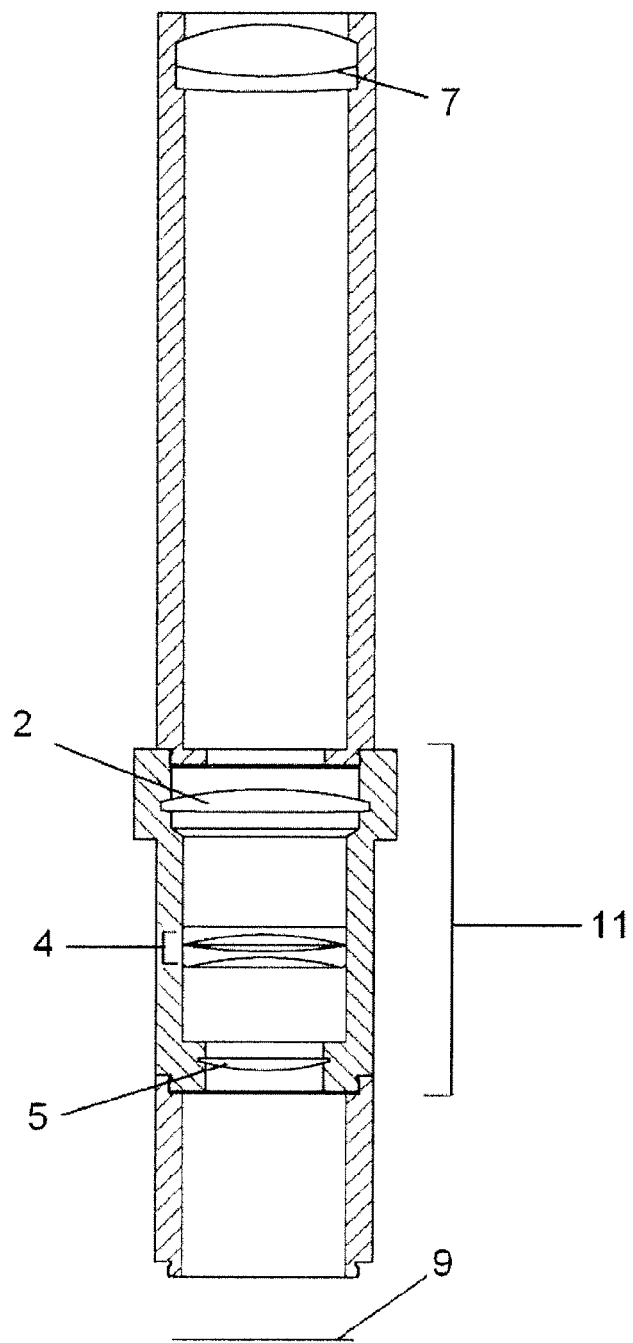
FIG. 3 is a diagram of an optical system of the present invention, where the modular afocal variator of FIG. 1 has been positioned within the optical system of FIG. 2 according to the formula described herein. When properly positioned within the optical system in relation to the original focal plane, the modular afocal variator is able to impart not only focus but also essentially constant magnification during focal translation.

The modular afocal variator 11 is joined to an optical system of virtually any type which can physically accommodate the modular afocal variator 11 spaced according to a formula provided herein, whether it incorporates mechanical focus, another afocal variator or internal focusing system or any other focusing system other than that provided by the present invention. FIG. 2 shows an optical system having an objective lens system 7 within an optical housing 1 with a conventional back tube length. The objective lens system 7 produces an image at the focal plane 9 (the original focal plane) at the back distance of the optical housing 1. The modular afocal variator 11 is attached or positioned within the optical housing 1 of the optical system as illustrated in FIG. 3. The modular afocal variator 11 can further be attached to a top visual (e.g. eyepiece), photographic material, sensor or any other electromagnetic or electro-optical recording medium know to the art.

Figure 4:
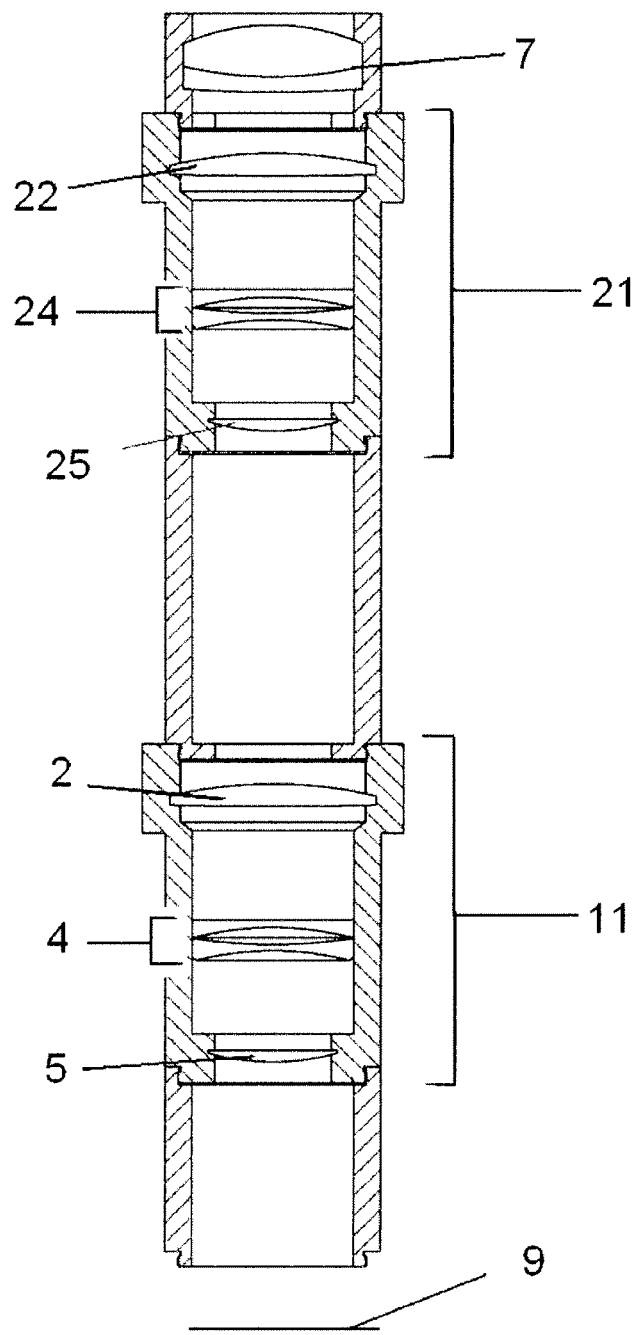
FIG. 4 is a diagram of the optical system of FIG. 3 further having a second modular afocal variator as used for establishing primary focus per U.S. Pat. No. 4,988,173 (Margolis).

The optical system can further comprise additional optical components used in optical devices. In one example, the optical system incorporates a second modular afocal variator 21 as illustrated in FIG. 4. The second modular afocal variator 21 contains its own first positive lens system 22, central negative system 24 and second positive lens system. When placed in a position within the optical system outside of the formula disclosed herein, the second modular afocal variator 21 is able to provide focus as disclosed in U.S. Pat. No. 4,988,173 (Margolis). When used in conjunction with the modular afocal variator 11 positioned according to the formula disclosed herein, the second modular afocal variator 21 is able to provide primary focus to the optical system and the modular afocal variator 11 is able to provide secondary or fine focus while maintaining essentially constant magnification during the fine focus. Additional optical components can be used as known in the art depending on the desired design of the optical system.

To impart not only focus but essentially constant magnification throughout focal translation, the position of the modular afocal variator 11 is not indiscriminately positioned within the optical system, but rather occupies a specific position within the optical system according to a formula. The modular afocal variator 11 of the present invention is carefully positioned so that the first positive lens system 2 is 66% (+/−15%) of its focal length down from where the intermediary image would have been formed in the conventional tube length system, i.e. focal plane 9. In the embodiments described in FIGS. 1-3, where the first and second positive lens systems each have a focal length of c.160 mm and the central negative lens system has a focal length of c.−60 mm, this is equivalent to the first positive lens system 2 being positioned 66% of 160 mm, or c. 106 mm, from focal plane 9. Likewise, a formula pertains to the spacing required between the second positive lens system 5 of the modular afocal variator 11 to the focal plane 9. This is determined as 100% (+/−15%) of the central negative lens system's 4 focal length, expressed as positive added spacing. Using the above measurements, this is equivalent to the second positive lens system 5 being positioned 100% of 60 mm, or c.60 mm, from focal plane 9.

It is therefore seen that the prior art single-purpose focusing afocal variator is now transformed into a system which provides not only indiscriminate magnification altering focus, but the novel characteristic based on a formula-specific position in an optical system that provides near constant magnification throughout focal translation.

The systems taught herein, and current or future equivalents which can be derived from it, can be made from any suitable combination of optical materials or lens types, be they of whatever refractive, diffractive and dispersive characteristics as known in the art, the only limitation being their suitability for actual use. In addition, the use of single or multiple focal variator systems in other applications for focus, to concentrate or to disperse light or other electromagnetic wavelengths is also taught. While not shown in FIGS. 1 through 4, the addition of art known fixed or variable diaphragms or tapered tubes inside the optical system components may be used to obtain an excellent depth of field or to control other aberrations as well as the speed of the entire system as focus is translated.

It is therefore seen that the present invention teaches and provides optical systems in which an afocal variator is so positioned in optical systems so that essentially constant magnification is maintained throughout focal translation in accordance with the formula taught by the present invention, thereby providing two functions to such systems: variable internal focusing and active maintenance of magnification during such. The present invention also provides this focusing capability to virtually any optical system into which it can be physically introduced, according to the formula provided herein. In addition, the present invention teaches an active maintenance of constant magnification throughout focal translation which can be modular in which case, it could be removed or be supplemental to, any optical systems in which it can be physically interfaced.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description.

All references cited in this application are hereby incorporated in their entireties by reference to the extent that they are not inconsistent with the disclosure in this application. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques specifically described herein are intended to be encompassed by this invention.

What is claimed is:

1. An imaging optical system comprising:
   a. an optical housing;
   b. an objective lens system disposed at one end of the optical housing and having a focal plane; and
   c. a modular afocal variator disposed within the optical housing in optical series with the objective lens system, wherein the modular afocal variator comprises a first positive lens system, a central negative lens system, and a second positive lens system, where the central negative lens system is positioned between the first and second positive lens systems and is able to be moved continuously towards and away from the first positive lens system and towards and away from the second positive lens system,
   wherein the modular afocal variator is positioned so that the distance between the first positive lens system and the focal plane is 66% (±15%) of the focal length of the first positive lens system, and the distance between the second positive lens system and the focal plane is 100% (±15%) of the absolute value of the focal length of the central negative lens system, and
   wherein the modular afocal variator provides focus to the optical system while maintaining essentially constant magnification throughout the focal translation.

2. The optical system of claim 1 further comprising a second afocal variator, wherein the first modular afocal variator is able to provide fine focus with essentially constant magnification throughout the focal translation the second afocal variator is able to provide primary focus to said optical system.

3. The optical system of claim 1 further comprising means for activating focus of the optical system, wherein means for activating focus is motorized activation or remote control activation.

4. The optical system of claim 1 further comprising one or more port positions able to split a beam of light traveling through the optical system, wherein one or more port positions comprise a modular afocal variator positioned to allow an image to be focused without essential magnification change beyond the original depth of field of the imaging optical system.

5. A method of focusing an optical image system having a focal plane comprising the steps of positioning a modular afocal variator having a first positive lens system, a central negative lens system, and a second positive lens system, within said optical image system so that the distance between the first positive lens system and the focal plane is 66% (±15%) of the focal length, as expressed in positive physical dimensional measurement, of the first positive lens system, and the distance between the second positive lens system and the focal plane is 100% (±15%) of the focal length, as expressed in positive physical dimensional measurement, of the central negative lens system,
   wherein focal translation above, through and below an object is essentially constant and without appreciable magnification change over a distance beyond that of the original depth of field of the optical image system in which the modular afocal variator system is incorporated.

* * * * *